(12) United States Patent
Nakhamkin

(10) Patent No.: US 8,261,552 B2
(45) Date of Patent: Sep. 11, 2012

(54) ADVANCED ADIABATIC COMPRESSED AIR ENERGY STORAGE SYSTEM

(75) Inventor: Michael Nakhamkin, Basking Ridge, NJ (US)

(73) Assignee: Dresser Rand Company, Olean, NY (US)

( * ) Notice: Subject to any disclaimer, the term of this patent is extended or adjusted under 35 U.S.C. 154(b) by 253 days.

(21) Appl. No.: 12/818,186

(22) Filed: Jun. 18, 2010

(65) Prior Publication Data

US 2010/0251712 A1     Oct. 7, 2010

Related U.S. Application Data

(60) Continuation-in-part of application No. 12/632,841, filed on Dec. 8, 2009, now Pat. No. 8,011,189, which is a continuation-in-part of application No. 12/582,720, filed on Oct. 21, 2009, which is a division of application No. 12/285,404, filed on Oct. 3, 2008, now Pat. No. 7,614,237, which is a continuation-in-part of application No. 12/216,911, filed on Jul. 11, 2008, now abandoned, which is a continuation of application No. 12/076,689, filed on Mar. 21, 2008, now Pat. No. 7,406,828, which is a division of application No. 11/657,661, filed on Jan. 25, 2007, now abandoned.

(51) Int. Cl.
    *F01K 1/00*     (2006.01)
    *F01K 3/00*     (2006.01)
(52) U.S. Cl. ........................................................ 60/659
(58) Field of Classification Search ................. 60/659
See application file for complete search history.

(56) References Cited

U.S. PATENT DOCUMENTS

| 3,677,008 | A | * | 7/1972 | Koutz | 60/650 |
| 4,358,250 | A | | 11/1982 | Payne | |
| 4,523,432 | A | * | 6/1985 | Frutschi | 60/659 |
| 4,765,142 | A | * | 8/1988 | Nakhamkin | 60/652 |

(Continued)

FOREIGN PATENT DOCUMENTS

DE     102004040890 A1     3/2005

(Continued)

OTHER PUBLICATIONS de Biasi, "Fundamental analyses to optimize adiabatic CAES plant efficiencies", Gas Turbine World, Sep.-Oct. 2009.

*Primary Examiner* — Thomas Denion
*Assistant Examiner* — Christopher Jetton
(74) *Attorney, Agent, or Firm* — Edward J. Stemberger

(57) ABSTRACT

An adiabatic Compressed Air Energy Storage (CAES) system includes a low pressure compressor structure (14) to provide compressed air; a first heat exchanger (26) to extract heat from the compressed air exiting the low pressure compressor structure; a thermal storage device (60) to store the extracted heat during off-peak load periods; a motor-driven high pressure compressor (30) to receive compressed air cooled by the first heat exchanger, an aftercooler (34) to extract heat from the further compressed air; an air storage (36) to receive and store the further compressed air cooled by the second heat exchanger; a second heat exchanger (64) to transfer heat stored in the first thermal storage device to compressed air released from the air storage during peak periods; and a turbine structure (40) to expand the heated compressed air released from the air storage to produce power.

21 Claims, 3 Drawing Sheets

U.S. PATENT DOCUMENTS

| | | | |
|---|---|---|---|
| 4,872,307 A * | 10/1989 | Nakhamkin | 60/772 |
| 4,872,308 A * | 10/1989 | Nagai et al. | 60/316 |
| 4,885,912 A | 12/1989 | Nakhamkin | |
| 5,181,376 A | 1/1993 | Rao | |
| 5,384,489 A * | 1/1995 | Bellac | 290/44 |
| 5,442,904 A | 8/1995 | Shnaid | |
| 5,537,822 A * | 7/1996 | Shnaid et al. | 60/659 |
| 5,934,063 A | 8/1999 | Nakhamkin | |
| 6,305,158 B1 | 10/2001 | Nakhamkin | |
| 6,745,569 B2 | 6/2004 | Gerdes | |
| 7,150,154 B2 | 12/2006 | Althaus et al. | |
| 7,500,349 B2 | 3/2009 | Althaus | |
| 2003/0131599 A1 | 7/2003 | Gerdes | |
| 2008/0178602 A1 | 7/2008 | Nakhamkin | |
| 2008/0272597 A1 | 11/2008 | Althaus | |
| 2011/0094231 A1 | 4/2011 | Freund | |
| 2011/0100010 A1 | 5/2011 | Freund | |

FOREIGN PATENT DOCUMENTS

| | | |
|---|---|---|
| RU | 2029119 C1 | 2/1995 |
| SU | 383859 A | 8/1973 |
| WO | 9222741 A1 | 12/1992 |

* cited by examiner

I

ADVANCED ADIABATIC COMPRESSED AIR ENERGY STORAGE SYSTEM

This application is a continuation-in-part of U.S. application Ser. No. 12/632,841, filed on Dec. 8, 2009, now U.S. Pat. No. 8,011,189, which is a continuation-in-part of U.S. application Ser. No. 12/582,720, filed on Oct. 21, 2009, which is a division of U.S. application Ser. No. 12/285,404, filed on Oct. 3, 2008, now U.S. Pat. No. 7,614,237 which is a continuation-in-part of U.S. application Ser. No. 12/216,911 filed on Jul. 11, 2008, abandoned, which is a continuation of U.S. application Ser. No. 12/076,689, filed on Mar. 21, 2008, now U.S. Pat. No. 7,406,828, which is a division of U.S. application Ser. No. 11/657,661, filed on Jan. 25, 2007, abandoned. The content of each of these applications is hereby incorporated by reference into this specification.

TECHNICAL FIELD

This invention relates to a Compressed Air Energy Storage (CAES) system and, more particularly, to an adiabatic CAES system that provides improved performance of renewable energy sources by operating a CAES plant with generally zero emissions and without burning any fuel.

In my earlier U.S. Pat. No. 4,765,142, the content of which is hereby incorporated by reference into this specification, I disclosed a system that stores the heat of compression which is used as an alternative to produce steam for injection into a combustion process. The system theoretically offered high energy storage efficiently, but required new research and development efforts associated with high capital costs to implement. That is why such systems have never been implemented.

There is a need to provide an adiabatic CAES system with improved storage and recovery of the heat of compression by employing practical implementation solutions.

SUMMARY

An object of the invention is to fulfill the needs referred to above. In accordance with an embodiment, this objective is fulfilled by utilizing modified combustion turbine assembly components as well as slightly upgraded industrial components, integrated in specifically optimized innovative adiabatic CAES plant thermal cycles/concepts. The adiabatic CAES system includes a low pressure compressor structure, which can be an industrial compressor or part of a combustion turbine assembly, constructed and arranged to provide compressed air. A first heat exchanger is constructed and arranged to extract heat from the compressed air outputted by the low pressure compressor structure. A first thermal storage device is constructed and arranged to store the extracted heat during off-peak load periods. A motor-driven high pressure compressor is constructed and arranged to receive compressed air cooled by the first heat exchanger. The high pressure compressor includes an intercooler. An aftercooler is constructed and arranged to extract heat from the further compressed air without any provision to store thermal energy due to the heat extraction by the intercooler. An air storage is constructed and arranged to receive and store the further compressed air cooled by the aftercooler. A second heat exchanger is constructed and arranged to transfer heat stored in the first thermal storage device to preheat compressed air released from the air storage during peak periods. A turbine structure, which can be an industrial turbine or part of a combustion turbine assembly, is constructed and arranged to expand the preheated compressed air released from the air storage to produce power.

In accordance with another aspect of an embodiment, a method of utilizing and recovering energy and heat obtained during low pressure compression of air in an adiabatic Compressed Air Energy Storage (CAES) system includes compressing air in a low pressure compressor structure during an off-peak load period. Thermal energy is extracted from the compressed air thereby producing cooled compressed air. The extracted thermal energy is stored in a thermal energy storage device. The cooled compressed air is further compressed in a high pressure compressor having an intercooler. The further compressed air outputted by the high pressure compressor is cooled in an aftercooler. The cooled further compressed air is stored in the compressed air storage during the off-peak load period. The compressed air is released from the air storage during a peak load period and is heated using heat stored in the thermal energy storage device. The heated compressed air is expanded in a turbine to produce power.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DESCRIPTION OF EXAMPLE EMBODIMENTS

As noted above, the power plant of U.S. Pat. No. 4,765,142 has not been commercially implemented due to the high capital cost of providing components of the plant. In particular, there is a high capital cost of research and development of the low pressure compressor of the plant so as to have the required discharge pressure and temperature. A combustion turbine assembly comprises a compressor and a turbine on a single shaft, with a combustor feeding the turbine. The turbine is connected with an electric generator to produce power. The combustion turbine assembly compressor is effective for use in an adiabatic CAES plant due to the fact that the combustion turbine assembly is similarly to an adiabatic CAES plant capitalizing on both the low pressure compressor discharge pressure and temperature. Industrial compressors are not as attractive for use as the low pressure compressor in an adiabatic plant since they have intercoolers because they are targeting only the compressed air/gas specified pressure with minimum power consumption.

Figure 1:
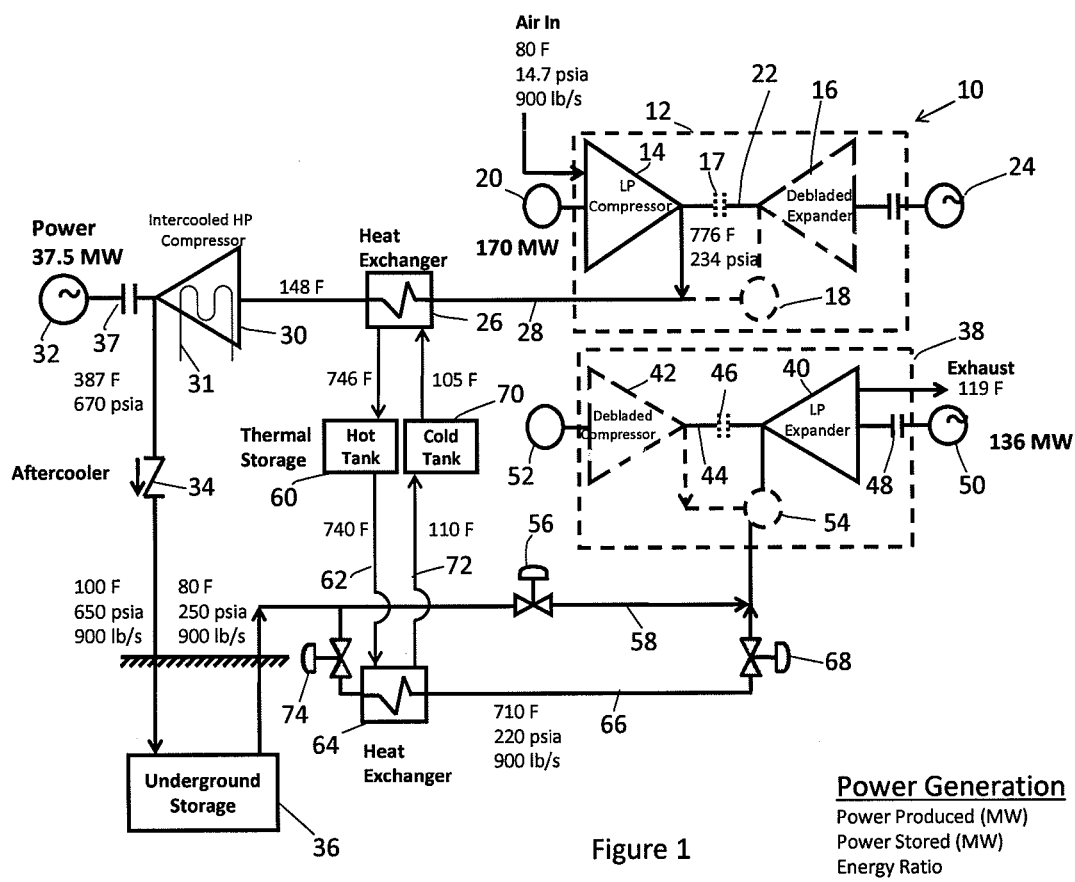
FIG. 1 is a view of an adiabatic CAES system provided in accordance with a first embodiment thereof, utilizing a first combustion turbine assembly having a debladed turbine and a second combustion turbine assembly having a debladed compressor.

With the above in mind, FIG. 1 shows an advanced adiabatic CAES system, generally indicated at 10, in accordance with an embodiment. The system 10 includes a first single shaft combustion turbine assembly 12, having a low pressure compressor 14 receiving a source of inlet air and a turbine element 16 that is initially debladed since such turbine element is not to be utilized for the production of energy. Consequently, the inlet to the turbine element 16 is disconnected or closed and no fuel will be supplied to combustor 18 during this energy absorbing compression stage. In order to compensate for the axial loss of thrust balance due to deblading turbine element 16, an externally located additional thrust bearing 20 is installed on shaft 22. Shaft 22 serves to transmit rotational energy from a synchronous electrical generator/motor, illustratively, motor 24, to debladed turbine element 16, compressor 14 and thrust bearing 20.

A compressor discharge flange (not shown) is typically provided in the compressor of a conventional combustion turbine assembly to direct compressed air to combustor 18. However, in the embodiment, such compressed air input to combustor 18 is disconnected and the compressed air is instead directed to a first heat exchanger 26 via interconnection 28.

In addition to the above modification to combustion turbine assembly 12 and heat exchanger 26, an industrial high pressure compressor 30, driven by motor 32, and an aftercooler 34 are provided to complete the compression train.

High pressure compressor 30 further compresses the air outputted by the low pressure compressor 14. High pressure compressor 30 is preferably driven through clutch 37 by the motor 32. Alternatively, high pressure compressor 30 may be driven by motor 24. The high pressure compressor 30 provides the additional pressure increase of the compressed air that is optimized based on a number of considerations such as the effects on the compressed air storage design and costs, and the effects on energy recovery and generation during peak hours. To minimize power consumption, the high pressure industrial compressor 30 has at least one intercooler 31 resulting in a temperature of compressed air outputted there-from to be substantially less than the temperature of compressed air outputted by the low pressure compressor 14.

Since no heat is stored due to compression by the high pressure compressor, the aftercooler 34 is not associated with a thermal storage device but merely further cools the compressed air exiting high pressure compressor 30 before entering the air storage 36. The aftercooler 34 can be air or water cooled.

In the embodiment, the air storage 36 is preferably an underground air storage such as a geological structure. Alternatively, the air storage 36 can be an above-ground pressure vessel that also could be a tower of a wind power plant. Although in the embodiment, compressed air is preferably stored in the air storage 36, the compressed air can be converted into a liquid air and stored in the air storage 36. When needed, the liquid air can then be converted back to compressed air and used in the system 10.

The system 10 includes a second combustion turbine assembly 38 that comprises a turbine 40 and a compressor 42 connected to a single shaft 44. Compressor 42 is initially debladed since such compressor is not to be utilized for the compression of air. In order to compensate for the axial loss of thrust balance due to deblading compressor 42, an externally located additional thrust bearing 52 is installed on the shaft 44. Shaft 44 serves to transmit rotational energy from the turbine 40 to a synchronous electrical machine, illustratively, generator 50, debladed compressor 42, and thrust bearing 52.

In addition to the above modifications to the combustion turbine assembly 38, the compressed air output of the compressor 42 is disconnected or closed. The combustor 54 is also non-functioning. Further, a valve 56 and associated interconnection 58, such as piping, are placed between the non-functioning combustor 54 and the air storage 36. Valve 56 and air storage 36 serve as a compressed air source for the turbine 40, in place of compressor 42.

The conventional combustion turbine assembly is ordinarily coupled to an electrical power generator of predetermined capacity. In accordance with the embodiment, the electrical generator of the conventional combustion turbine assembly is removed and replaced by an electrical generator 50 of approximately double capacity since combustion turbine assembly 38 has approximately twice its original output once the compressor is debladed. Although the second combustion turbine assembly 38 provides the turbine 40, an industrial turbine can be used instead.

Adiabatic compressed air storage is different from a conventional CAES system in that it captures, stores, and returns heat during the compression cycle in order to conserve and recover the stored energy. In that regard, a first thermal energy storage device 60, preferably a hot oil storage tank for storing thermal energy by heated oil in the tank, is connected to an outlet of the first heat exchanger 26. An outlet of the first thermal energy storage device 60 is connected, via piping 62, with a second heat exchanger 64 to provide heat to compressed air released from the storage 36, as will be explained more fully below. An outlet of the second heat exchanger 64 is connected via piping 66 to an inlet of the turbine 40. A valve 68 is provided in piping 66 to control flow there-through. A second thermal energy storage device 70 is connected, via piping 72, with the second heat exchanger 64. The second thermal energy storage device 70 is preferably a cold oil storage tank for storing cooled oil in the tank. An outlet of the second thermal storage device 70 is connected to the first heat exchanger 26 to remove heat from the compressed air from compressor 14 and to heat the oil.

In accordance with the embodiment, during off-peak hours energy (which is not currently needed) is used by the motor-driven compressor 30 and is stored in the form of the compressed air in the air storage 36. The energy of the stored compressed air depends on a combination of the stored air pressure and stored air temperature. In addition, the size and cost of the compressed air storage 36 depends on the compressed air pressure and air temperature. In the case of an underground storage, the stored air temperature is very limited by geological limitations and at times should not exceeding 80° F. In the conventional CAES plant, the compressed air is just cooled to an acceptable stored air temperature level and the heat is wasted. In the adiabatic CAES system 10, during off-peak hours, oil in the cold oil tank 70 is heated in heat exchanger 26 by the exhaust heat of the compressed air from the low pressure compressor 14. The heated oil is transferred and stored in the hot oil tank 60. In the embodiment, the temperature of the compressed air outputted by the low pressure compressor 14' was 776° F. as compared to the temperature of 387° F. of the compressed air outputted by the high pressure compressor 30. The temperature of the compressed air was reduced further to 100° F. upon exiting the aftercooler 34 and upon entering the air storage 36.

During peak hours, the stored energy is recovered and utilized for peak power generation by using the stored compressed air energy based on the most effective and optimized combination of the stored compressed air pressure and temperature. More particularly, during peak hours, compressed air is released from the air storage 36 at specific pressure and temperature and is routed through flow control and pressure reducing valve 74 through heat exchanger 64. The hot oil stored in the hot oil tank 60 is directed to the heat exchanger 64 for heating the compressed air released from the air storage 36. The heated compressed air is then sent via piping 66 to the inlet of the non-functioning combustor 54 or directly to the turbine 40 which expands the heated compressed air to produce electrical power via generator 50. Cold oil resulting from transferring heat to the compressed air released from the air storage is transferred to and stored in the cold oil tank 70.

Figure 2:
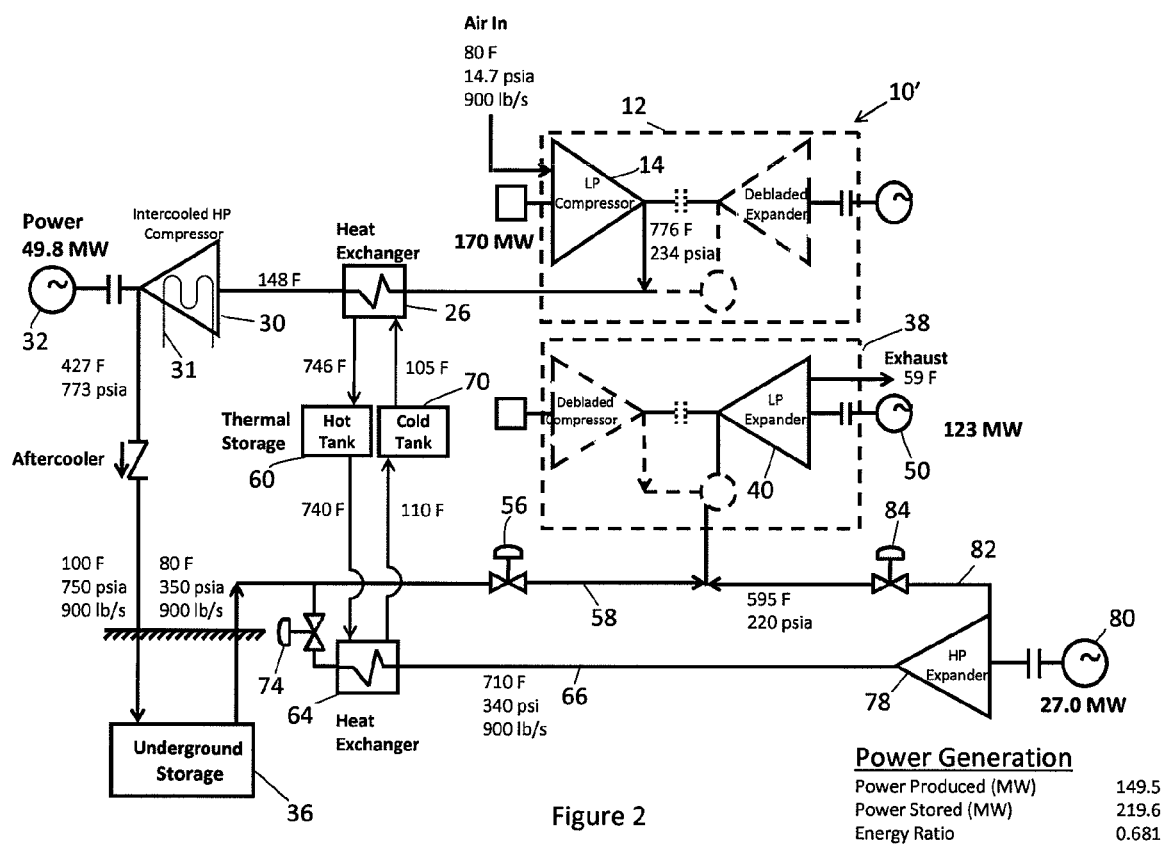
FIG. 2 is a view of the system of FIG. 1, and further including an additional expander downstream of the air storage and upstream of the second combustion turbine assembly.

FIG. 2 shows another embodiment of an adiabatic CAES system, generally indicated at 10'. The system 10' is identical to the system 10 of FIG. 1, but further includes an additional high pressure expander 78. In particular, the expander 78 is connected with piping 66 such that compressed air can be routed from the air storage 36 through flow control valve 74, be preheated in a heat exchanger 64 that utilizes the hot oil from hot oil tank 60 and be expanded through the green power generation expander 78 driving an electric generator 80 to produce additional electrical power. The expander 78 has air extraction via interconnection 82 and through valve 84 to supply the extracted air upstream of the turbine 40. Although all exhaust air from expander 78 is sent to the turbine 40, it can be appreciated that only a portion of the airflow expanded in the expander 78 can be sent to the turbine 40, with the remaining airflow being expanded in a low pressure part of the expander 78 to atmospheric pressure, generating the additional green electrical power.

Figure 3:
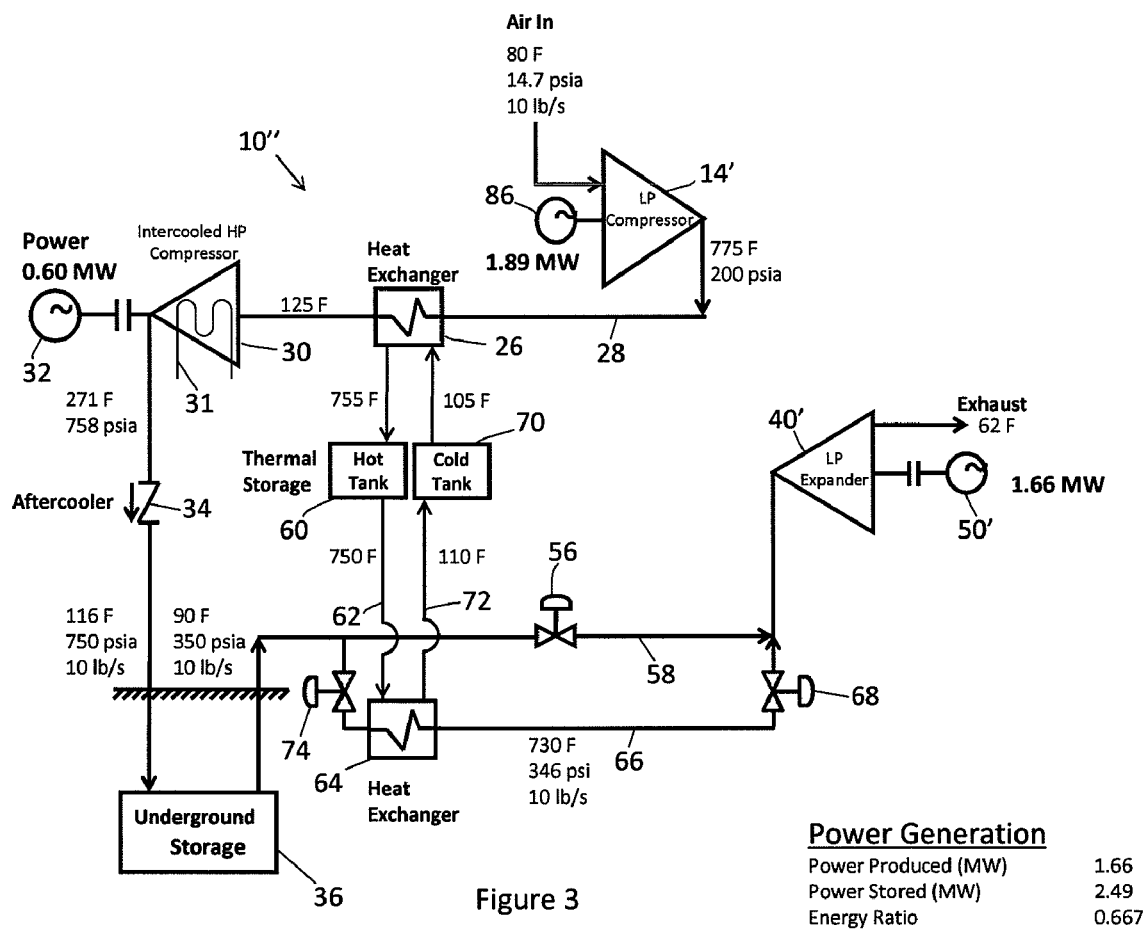
FIG. 3 is a view of an adiabatic CAES system provided in accordance with a second embodiment thereof, using a motor driven low pressure compressor and a motor driven high pressure compressor for off-peak energy storage and an expander for producing power.

FIG. 3 shows another embodiment of an adiabatic CAES system, generally indicated at 10". Instead of using the combustion turbine assemblies 12 and 38, to provide the low pressure compressor 14 and the turbine 40 of FIG. 1, the system 10" uses a low pressure industrial compressor 14' driven by motor 86 and an industrial turbine 40' for driving the generator 50'. The system 10" operates in a similar manner as the system 10 as discussed above with regard to FIG. 1. In the embodiment, the temperature of the compressed air outputted by the low pressure compressor 14' was 775° F. as compared to the 271° F. temperature of the compressed air outputted by the high pressure compressor 30. The temperature of the compressed air was reduced further to 116° F. upon exiting the aftercooler 34 and upon entering the air storage 36.

Also, although not shown in FIG. 3, the additional expander 78 can be provided in the system 10". Furthermore, the turbine 40' can be replaced with the combustion turbine assembly 38 having the turbine 40 and the debladed compressor on the single shaft 44 of FIG. 1, or with a turbine from a conventional combustion turbine assembly that has its own shaft that is separated from compressor shaft via a flange 46 (FIG. 1). It is noted that when flange 46 provided and is disconnected, there is no need to debladed compressor 42 since it can simply be removed. Similarly, the compressor 14' can be replaced with the combustion turbine assembly 12 having the compressor 14 and the debladed turbine element on the single shaft 22 of FIG. 1, or with a compressor from a conventional combustion turbine assembly that has its own shaft that is separated from turbine shaft via a flange 17 of FIG. 1. It is noted that when flange 17 is provided and disconnected, there is no need to debladed turbine element 16 since it can simply be removed. Thus, any combination of the disclosed compressors 14, 14' and turbines 40, 40' can be used.

Although the thermal energy storage devices 60 and 70 are shown as separate oil tanks, these devices can be incorporated into a single structure having the appropriate tanks. Also, instead of heavy oil, the thermal fill material can be molten salt or ceramics or other suitable material for storing thermal energy.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. An adiabatic Compressed Air Energy Storage (CAES) system, comprising:
   a low pressure compressor structure constructed and arranged to compress air and to discharge the compressed air at temperature sufficient to provide the only heat needed in the system to produce power;
   a first heat exchanger constructed and arranged to extract heat from the compressed air outputted by the low pressure compressor structure;
   a thermal storage device constructed and arranged to store the extracted heat during off-peak load periods;
   a motor-driven high pressure compressor constructed and arranged to receive compressed air cooled by the first heat exchanger for further compression;
   an aftercooler constructed and arranged to extract heat from the further compressed air without any provision to store thermal energy;
   an air storage constructed and arranged to receive and store the further compressed air cooled by the aftercooler;
   a second heat exchanger constructed and arranged to transfer heat stored in the thermal storage device to preheat the compressed air released from the air storage during peak periods; and
   a turbine structure constructed and arranged to expand the preheated compressed air released from the air storage to produce power,
   wherein the preheated compressed air expanded by the turbine structure is heated only by heat from the thermal storage device and without burning fuel.

2. The system of claim 1, further comprising a second thermal energy storage device constructed and arranged to store thermal energy resulting from the transfer of heat to the compressed air released from the air storage during peak periods, the second thermal energy device being in communication with the first heat exchanger so that exhaust heat from the low pressure compressor structure can preheat material stored in the second thermal energy storage device during off-peak periods, thereby cooling the compressed air outputted by the low pressure compressor structure.

3. The system of claim 1, wherein the thermal energy storage devices are each a tank containing oil.

4. The system of claim 1, wherein the low pressure compressor structure comprises a combustion turbine assembly having a shaft coupled to a motor, and a compressor and a debladed turbine element on the shaft.

5. The system of claim 1, wherein the turbine structure comprises a combustion turbine assembly having a shaft coupled to a generator, a debladed compressor element and a turbine on the shaft.

6. The system or claim 1, wherein each of the low pressure compressor structure and the turbine structure is part of a flanged combustion turbine assembly.

7. The system of claim 1, wherein the air storage is an underground air storage.

8. The system of claim 1, further comprising an expander constructed and arranged to expand the heated compressed air released from the air storage to produce power in addition to power produced by the turbine structure.

9. The system of claim 8, wherein the expander is constructed arranged such that exhaust thereof is received by the turbine structure.

10. The system of claim 8, wherein the expander is constructed arranged such that all of the exhaust thereof is received by the turbine structure.

11. A method of utilizing and recovering energy and heat obtained during low pressure compression of air in an adiabatic Compressed Air Energy Storage (CAES) system, the method comprising the steps of:
provided a low pressure compressor structure and a high pressure compressor structure,
compressing air in the compressor structures during an off-peak load period;
extracting thermal energy from the compressed air discharged from the compressor structures thereby producing cooled compressed air;
storing the extracted thermal energy in a thermal energy storage device, with the stored thermal energy being the only thermal energy needed by the system to produce power;
cooling the compressed air outputted by the high pressure compressor in an aftercooler;
storing the cooled further compressed air in an air storage during the off-peak load period,
releasing compressed air from the air storage during a peak load period;
heating the compressed air released from the air storage using only heat stored by the thermal energy storage device and without burning fuel; and
expanding the heated compressed air in a turbine structure to produce power.

12. The method of claim 11, wherein the step of compressing the air in the low pressure compressor structure includes compressing the air in a compressor of a combustion turbine assembly, the combustion turbine assembly having a shaft coupled to a motor, and a compressor and a debladed turbine element on the shaft.

13. The method of claim 11, wherein the step of expanding the heated compressed air in a turbine structure includes expanding the heated compressed air in a turbine of combustion turbine assembly, the combustion turbine assembly having a shaft coupled to a motor, and a debladed compressor and a turbine on the shaft.

14. The method of claim 12, wherein the step of expanding the heated compressed air in a turbine structure includes expanding the heated compressed air in a turbine of another combustion turbine assembly, the another combustion turbine assembly having a shaft coupled to a motor, and a debladed compressor and a turbine on the shaft.

15. The method of claim 11, further comprising:
the step of extracting thermal energy includes extracting thermal energy from the low pressure compressor structure and includes preheating material stored in a second thermal energy storage device using exhaust heat from the low pressure compressor structure during off-peak periods and transferring the material to the thermal energy storage device; and
storing remaining thermal energy resulting from transferring heat during the heating of the released compressed air by transferring the material to the second energy storage device.

16. The method of claim 11, further comprising expanding the heated compressed air in an expander to produce power in addition to power produced by the turbine structure.

17. The method of claim 16, further comprising directing exhaust of the additional expander to the turbine structure.

18. The method of claim 11, wherein the low pressure compressor structure is part of a flanged combustion turbine assembly.

19. The method of claim 11, wherein the turbine structure and the low pressure compressor structure are each part of a flanged combustion turbine assembly.

20. The system of claim 1, wherein the low pressure compressor structure is a compressor from a combustion turbine assembly, the low pressure compressor having its own shaft that is separated from a turbine shaft via a flange.

21. The method of claim 11, wherein the step of extracting thermal energy extracts the thermal energy from only compressed air discharged from the low pressure compressor structure.

* * * * *